No. 772,170. PATENTED OCT. 11, 1904.
W. W. MORTON.
BRAKE SHOE FOR VEHICLES.
APPLICATION FILED DEC. 17, 1903.
NO MODEL.

WITNESSES:

INVENTOR
Wm. W. Morton
BY
ATTORNEY.

No. 772,170. Patented October 11, 1904.

UNITED STATES PATENT OFFICE.

WILLIAM W. MORTON, OF CAMDEN, NEW JERSEY.

BRAKE-SHOE FOR VEHICLES.

SPECIFICATION forming part of Letters Patent No. 772,170, dated October 11, 1904.

Application filed December 17, 1903. Serial No. 185,495. (No model.)

*To all whom it may concern:*

Be it known that I, WILLIAM W. MORTON, of the city and county of Camden, State of New Jersey, have invented an Improvement in Brake-Shoes for Vehicles, of which the following is a specification.

My invention has reference to brake-shoes for vehicles; and it consists of certain improvements which are fully set forth in the following specification and shown in the accompanying drawings, which form a part thereof.

The object of my invention is to provide a simple construction whereby among other advantages the brake-shoe is normally held upon the shoe-support in such a manner that it automatically adjusts itself to correspond to the position of the shoe relatively to the wheel-tire under varying loads. The said shoe being carried by the vehicle-body necessarily assumes various vertical positions under the varying loads carried by the body, and consequently introduces a requirement of adjustment.

In carrying out my invention I provide the transverse shaft or support for the brake-shoe with a collar and a sleeve, combined with means to clamp said sleeve against the collar, so as to make it substantially rigid with the transverse shaft or brake support, and a brake-shoe fitted about the sleeve. In this manner the sleeve may be made of any thickness for the purpose of properly fitting any brake-shoe on the transverse shaft.

My invention also comprehends, in connection with the above features, the employment of a spring held in place by the transverse shaft and adapted to press the brake-shoe against the collar of the brake-shaft to create a friction sufficient to normally hold the brake-shoe in definite position with capacity for automatic adjustment.

My invention further comprehends the employment of a washer interposed between the sleeve and the collar of the brake-shaft and provided with a laterally-projecting lug adapted to enter a recess in the side of the brake-shoe to limit the extreme oscillation of the brake-shoe upon the sleeve and at the same time to permit the said position of oscillation to be adjusted relatively to the brake-shaft.

My invention further comprehends details of construction which, together with the above features, will be better understood by reference to the drawings, in which—

Figure 1:
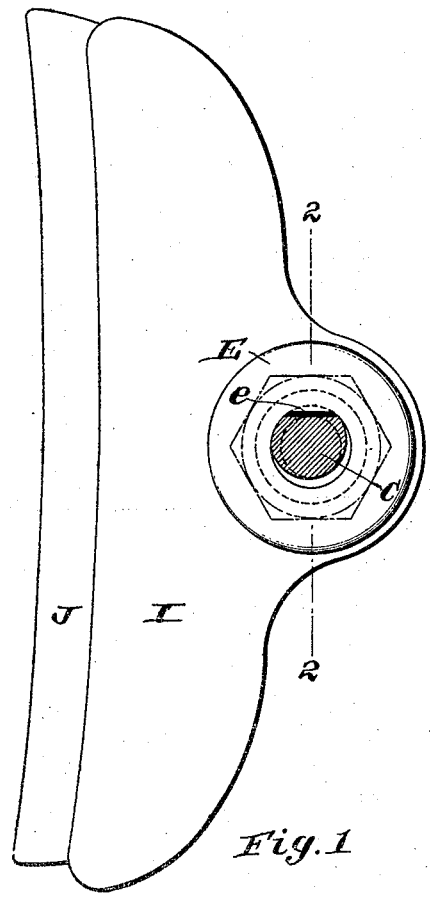
Figure 2:
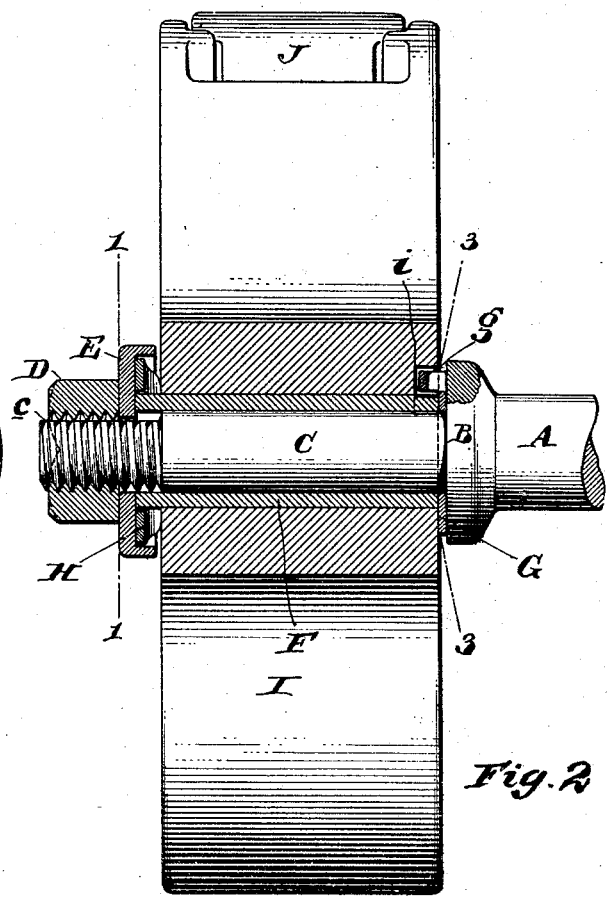
Figure 7:
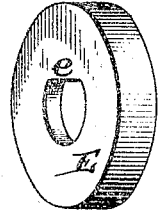
Figure 5:
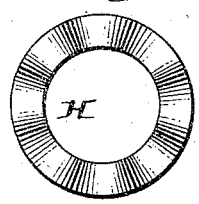
Figure 6:
Figure 4:
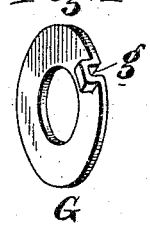
Figure 3:
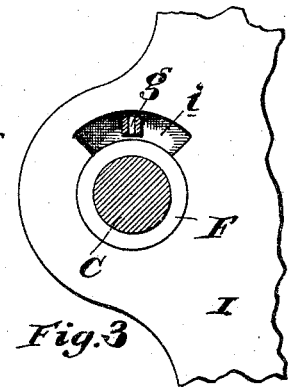

Figure 1 is a side elevation of a brake-shoe and with the brake-shaft in section, taken on line 1 1 of Fig. 2. Fig. 2 is a sectional elevation taken on line 2 2 of Fig. 1. Fig. 3 is a sectional elevation taken on line 3 3 of Fig. 2. Fig. 4 is a perspective view of the washer. Figs. 5 and 6 are plan and elevation views of the spring, and Fig. 7 is a perspective view of the spring-retaining cap.

A is the brake-shaft and is provided with a collar B and a spindle C. The end of the spindle is screw-threaded and provided with a clamping-nut D.

F is a sleeve which fits upon the spindle C and clamps the washer G between it and the collar B.

E is a spring-retaining cap and is clamped upon the end of the sleeve F by the nut D.

It will be seen that the cap E and the sleeve F and the washer G are clamped tightly and rigidly with respect to the brake-shaft A, so that they in effect constitute a part thereof.

I is the brake-shoe and is loosely journaled upon the sleeve F and presses against the washer G at one side by means of the action of a spring H, which encircles the sleeve F and is inclosed by the cap E. This spring is preferably made in the form shown in Figs. 5 and 6, in which it is annular in plan and serpentine in elevation, so as to provide a series of points of contact with both the cap E and the brake-shoe I.

J is a removable wearing part of the brake-shoe.

The washer G is provided with a laterally-extending projection or lug $g$, which is received in a recess $i$ in the seat of the brake-shoe I, as shown in Figs. 2 and 3. The recess $i$ is of considerable length, so as to give the brake-shoe some freedom of play relatively to the lug $g$; but said lug $g$ limits the possible oscillation of the brake-shoe on the sleeve F and relatively to the washer G.

The action of the spring H creates sufficient friction on the brake-shoe to hold it normally in any position assumed, and hence the brake-shoe has capacity for oscillating itself when brought in contact with the wheel-tire to adjust itself in position to properly act upon the tire. The position assumed by the brake-shoe depends on the extent of the load carried by the vehicle-body and which varying loads naturally depress the brake-shoe to different elevations relatively to the wheel. By loosening the nut D the washer G can be adjusted to any position desired and again clamped in place, and this will shift the lug g, so that the brake-shoe will have received a new adjustment with respect to the limit of oscillation.

My improvement comprehends, broadly, the feature of clamping an adjustable stop upon the brake-shaft, as it is evident that such an adjustable stop might be adapted to my invention in various ways without departing from the spirit of the invention.

The employment of the sleeve F enables any brake-shoe to be fitted to the brake-shaft, because it is only necessary to apply a sleeve of different thickness to compensate for a relative difference in the diameter of the hole in the brake-shoe and the diameter of the spindle C. In this manner there is no necessity at any time to disturb the brake-iron in making repairs. The spindle C at the end is made with the flattened surface c, and the spring-retaining cap is provided with a straight portion e in the hole, adapted to said flattened portion c, so as to prevent the said cap from turning, and thereby loosening the nut. In this manner the spring is held against a rigid surface, and there is no tendency whatever for the nut becoming unscrewed and loosening the sleeve and washer.

While I prefer the construction shown as being excellently adapted for the purpose of my invention, it is to be understood that I do not confine myself to the minor details, as these may be modified while retaining the essential characteristics of my improvements.

Having now described my invention, what I claim as new, and desire to secure by Letters Patent, is as follows:

1. In a brake-shoe for vehicles, the combination of a brake-shaft having a collar, a sleeve encircling the shaft, a brake-shoe loosely journaled upon the sleeve with freedom of oscillation, means to prevent the brake-shoe from rotating, a retaining-cap upon the end of the brake-shaft, and a spring interposed between the retaining-cap and the brake-shoe to retain the said shoe in any position assumed.

2. In a brake-shoe for vehicles, the combination of a brake-shaft having a collar, a sleeve encircling the shaft, a brake-shoe loosely journaled upon the sleeve, a retaining-cap upon the end of the brake-shaft, a spring interposed between the retaining-cap and the brake-shoe, and a washer positively clamped between the end of the sleeve and the collar of the brake-shaft and receiving the side thrust of the brake-shoe.

3. In a brake-shoe for vehicles, the combination of a brake-shaft having a collar, a sleeve encircling the shaft, a brake-shoe loosely journaled upon the sleeve, a retaining-cap upon the end of the brake-shaft, a spring interposed between the retaining-cap and the brake-shoe, and a washer positively clamped between the end of the sleeve and the collar of the brake-shaft and receiving the side thrust of the brake-shoe and also provided with a lateral projection or lug acting as a limit-stop for the oscillation of the brake-shoe upon the sleeve.

4. In a brake-shoe for vehicles, the combination of the transverse brake-shaft having a collar and spindle at the end, a sleeve fitted upon the spindle, a brake-shoe journaled upon the sleeve, a spring-retaining cap carried upon the spindle and held against rotation thereon, a nut screwed upon the end of the spindle to clamp the retaining-cap tightly against the sleeve, and an annular spring of sinuous form interposed between the cap and the brake-shoe and encircling the sleeve.

5. In a brake-shoe for vehicles, the combination of a transverse shaft having a collar, with a sleeve encircling the shaft, a washer clamped between the sleeve and the collar, a brake-shoe journaled upon the sleeve and resting against the washer, and means to clamp the sleeve against the washer and cause the brake-shoe to press against the said washer.

6. In a brake-shoe for vehicles, the combination of a transverse brake-shaft having a collar, a washer resting against the collar and provided with a projection, a sleeve encircling the shaft and pressing against the washer to clamp it, a brake-shoe journaled upon the sleeve and having means to receive the projection of the washer to limit the oscillation of the brake-shoe, and means to clamp the sleeve upon the washer and shaft.

7. In a brake-shoe for vehicles, the combination of a transverse brake-shaft having a collar, a brake-shoe journaled thereon, a part encircling the brake-shaft and provided with a lug acting as a limit-stop and directly coacting with the brake-shoe to limit its oscillation, and means to clamp said part having the lug adjustably upon the brake-shaft against the collar for the purpose of adjusting the position of oscillation of the brake-shoe.

In testimony of which invention I hereunto set my hand.

WM. W. MORTON.

Witnesses:
R. M. HUNTER,
R. M. KELLY.